(12) United States Patent
Chen et al.

(10) Patent No.: US 7,970,241 B2
(45) Date of Patent: Jun. 28, 2011

(54) HIGH EFFICIENT SILICON-ON-LITHIUM NIOBATE MODULATOR

(75) Inventors: Jianxiao Chen, North Billerica, MA (US); Charles Cox, Carlisle, MA (US)

(73) Assignee: Photonic Systems, Inc., Billerica, MA (US)

( * ) Notice: Subject to any disclaimer, the term of this patent is extended or adjusted under 35 U.S.C. 154(b) by 141 days.

(21) Appl. No.: 12/207,488

(22) Filed: Sep. 9, 2008

(65) Prior Publication Data

US 2009/0067771 A1    Mar. 12, 2009

Related U.S. Application Data

(60) Provisional application No. 60/967,875, filed on Sep. 10, 2007.

(51) Int. Cl.
  *G02F 1/035*    (2006.01)
  *H04J 14/08*    (2006.01)
  *H01L 21/00*    (2006.01)
  *H01S 3/00*     (2006.01)

(52) U.S. Cl. .............. 385/2; 385/1; 385/3; 385/122; 385/129; 385/132; 398/98; 398/101; 398/116; 398/141; 438/31; 359/333; 359/335; 359/341.31; 359/341.32; 359/341.5; 359/342; 359/344; 359/346; 359/349

(58) Field of Classification Search .............. 385/2, 8, 385/14, 122, 129–132, 141, 1; 359/333, 359/335, 341.31, 341.32, 341.5, 342, 344, 359/346, 349; 398/98, 101, 116, 141; 438/31
See application file for complete search history.

(56) References Cited

U.S. PATENT DOCUMENTS

| | | | |
|---|---|---|---|
| 5,825,519 A * | 10/1998 | Prucnal | 398/98 |
| 6,522,793 B1 * | 2/2003 | Szilagyi et al. | 385/2 |
| 6,807,204 B1 * | 10/2004 | O'Dowd | 372/32 |
| 7,200,308 B2 * | 4/2007 | Hochberg et al. | 385/122 |
| 7,339,724 B2 * | 3/2008 | Hochberg et al. | 359/335 |
| 7,373,058 B2 * | 5/2008 | Hochberg et al. | 385/122 |
| 7,424,192 B2 * | 9/2008 | Hochberg et al. | 385/122 |
| 7,519,257 B2 * | 4/2009 | Lipson et al. | 385/126 |
| 7,643,714 B2 * | 1/2010 | Hochberg et al. | 385/122 |
| 2002/0106141 A1 | 8/2002 | Gopalakrishnan | |
| 2003/0048976 A1 * | 3/2003 | Lundqvist | 385/14 |
| 2007/0189778 A1 | 8/2007 | Burns et al. | |

OTHER PUBLICATIONS

M. Hochberg, T. Baehr-Jones, G. Wang, J. Huang, P. Sullivan, L. Dalton, and A. Scherer, "Towards a millivolt optical modulator with nano-slot waveguides," Optics Express, vol. 15, pp. 8401-8410, Jun. 2007.

"Notification Concerning Transmittal of International Preliminary Report on Patentability (Chapter I of the Patent Cooperation Treaty)" for PCT/US2009/041058, Nov. 4, 2010, 6 pages, The International Bureau of WIPO, Geneva, Switzerland.

* cited by examiner

*Primary Examiner* — Brian M. Healy
*Assistant Examiner* — Guy G Anderson
(74) *Attorney, Agent, or Firm* — Kurt Rauschenbach; Rauschenbach Patent Law Group, LLP

(57) ABSTRACT

A modulator includes an electro-optical substrate and a first and second waveguide formed of a doped semiconductor material positioned on a surface of an electro-optical substrate forming a slot therebetween. A doping level of the semiconductor material being chosen to make the first and second waveguide conductive. A dielectric material is positioned in the slot which increases confinement of both an optical field and an electrical field inside the slot. A refractive index of the semiconductor material and a refractive index of the dielectric material positioned in the slot being chosen to reduce the $V\pi \cdot L$ product of the modulator.

17 Claims, 7 Drawing Sheets

HIGH EFFICIENT SILICON-ON-LITHIUM NIOBATE MODULATOR

RELATED APPLICATION SECTION

This application is a non-provisional patent application that claims priority to U.S. Provisional Patent Application Ser. No. 60/967,875, filed Sep. 10, 2007, entitled "High Efficiency Nano-Slot Waveguide Modulator." The entire specification of U.S. Provisional Patent Application Ser. No. 60/967, 875 is incorporated herein by reference.

The section headings used herein are for organizational purposes only and should not to be construed as limiting the subject matter described in the present application.

BACKGROUND OF THE INVENTION

High-efficiency electro-optic modulators are widely used in optical communication systems to convert analog or digital signals from the electrical domain to the optical domain. The modulation efficiency is generally dictated by the $V_\pi$, which is defined as the input voltage needed for the modulated arm or arms of the interferometer to accumulate a change in optical phase difference of $\pi$ radians. The lower the $V_\pi$, the better the modulation efficiency. Since $V_\pi$ can generally be reduced by increasing the electrical-optical field interaction length, L, designers often use the length-independent product of $V_\pi$ and the modulation length, $V_\pi \cdot L$, as a figure of merit for comparative evaluation of modulators.

Many conventional optical modulators are lithium niobate Mach-Zehnder Interferometric modulator (MZI modulators). The arms of typical interferometers are often made from Titanium-diffused lithium niobate waveguides. The $V\pi \cdot L$ product can be calculated. For example, the $V\pi \cdot L$ product at $\lambda = 1.55$ µm for a lithium niobate MZI modulator in which only one arm is driven by the modulation voltage can be calculated using the following expression:

$$V_\pi L = \frac{\lambda}{n^3 r_{33}} \frac{d}{\Gamma} = \frac{1.55 \text{ µm}}{2.14^3 \times 30.8 \times 10^{-6} \text{ µm}/V} \frac{\delta}{\Gamma} = 0.51 \frac{d}{\Gamma} (V \cdot cm) \quad (1)$$

where n is the typical lithium niobate refractive index, which is about 2.14, $r_{33}$ is the magnitude of the relevant electro-optic (EO) tensor, which is about $30.8 \times 10^{-6}$ µm/V, d is the gap between the electrodes in microns, and $\Gamma$ is the electrical-optical field overlap integral. The electo-optical field overlap integral is defined by the following expression:

$$\Gamma = \frac{d}{V} \frac{\int\int_s E_{opt}^2 E_x dx dy}{\int\int_s E_{opt}^2 dx dy} \quad (2)$$

where V is the applied voltage, $E_{opt}$ is the optical field, and $E_x$ is the electric field that is polarizing along the optical axis of the lithium niobate crystal. A typical value for the $V_\pi \cdot L$ product is 16.4 V·cm for a lithium niobate MZI modulator with a gap between the electrodes, d, equal to 20 µm and an electrical-optical field overlap integral, $\Gamma$ equal to 62%.

BRIEF DESCRIPTION OF THE DRAWINGS

The aspects of this invention may be better understood by referring to the following description in conjunction with the accompanying drawings. Identical or similar elements in these figures may be designated by the same reference numerals. Detailed description about these similar elements may not be repeated. The drawings are not necessarily to scale. The skilled artisan will understand that the drawings, described below, are for illustration purposes only. The drawings are not intended to limit the scope of the present teachings in any way.

DETAILED DESCRIPTION

Figure 1:
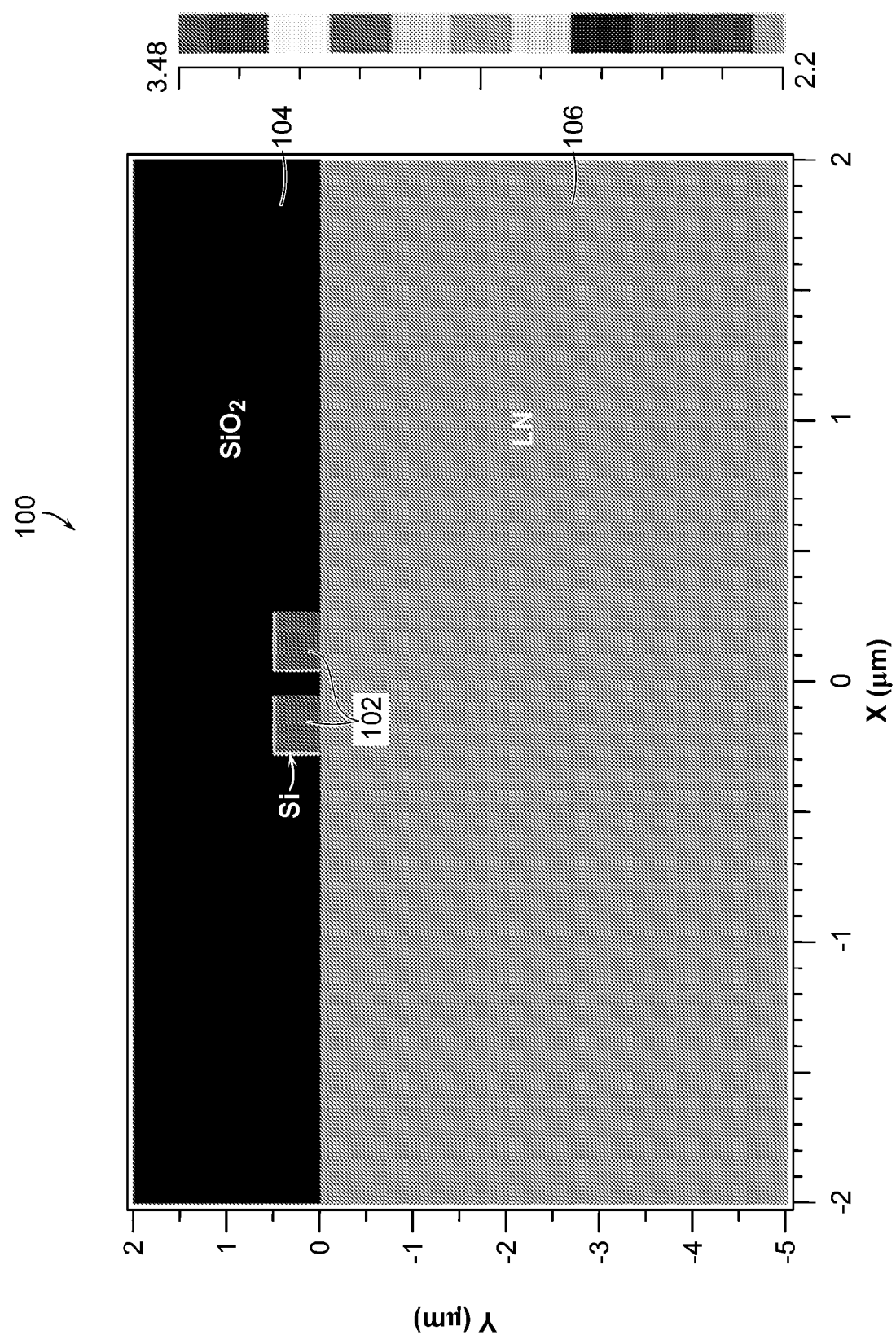
FIG. 1 illustrates a cross-sectional view of a Si-on-lithium niobate modulator according to the present invention that includes Si nano-slot waveguides and the corresponding refractive index profile.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

It should be understood that the individual steps of the methods of the present invention may be performed in any order and/or simultaneously as long as the invention remains operable. Furthermore, it should be understood that the apparatus and methods of the present invention can include any number or all of the described embodiments as long as the invention remains operable.

The present teachings will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teachings herein will recognize additional implementations, modifications, and embodiments, as well as other fields of use, which are within the scope of the present disclosure as described herein.

The present invention relates generally to optoelectronic devices used for optical communication systems. In particular, the present invention relates to optical modulators that can convert analog or digital electrical signals to optical signals with very high efficiency. That is, the present invention relates to a high efficiency optical modulator with a relatively low $V\pi \cdot L$ product. Such modulators have numerous applications in optical signal transmission and processing systems, such as long haul wavelength division multiplexing systems, local access networks, sensor networks, and radar remote systems.

Many sensor and antenna remote link applications require high-efficiency modulators with ultra-low $V_\pi \cdot L$ products. For example, it is desirable for some applications to have MZI modulators with a $V_\pi \cdot L$ product that is less than approximately 1 V·cm. Modulators with such ultra-low $V_\pi \cdot L$ products enable an RF optical link to have both high gain and low noise figure. Noise figure is a well known measure of signal-to-noise ratio degradation.

In order to achieve high-efficiency modulation, a highly efficient electro-optic material must be used. That is, the refractive index of the electro-optic material must be strongly dependent on the applied electric field. Optical modulators according to the present invention have relatively high efficiency because they improve or optimize both the structure of the optical waveguide in which the optical field is confined and also improve or optimize the structure of the electrodes in which the electrical signal is confined and in which an electric field is efficiently generated.

One aspect of the present invention is the use of Silicon (Si) nano-slot waveguides to form the arms of a Si-on-lithium niobate modulator with a relatively low $V_\pi \cdot L$ product. The term "nano-slot waveguide" is referred to herein as a waveguide arrangement that forms a very narrow slot that is on order of tens or hundreds of nanometers.

One feature of using Silicon (Si) nano-slot waveguides in lithium niobate MZI modulators is that a modulator can be constructed with a relatively small gap, d, between the electrodes that is on the order of 100 nm wide by forming the electrodes with heavily doped Si material. These heavily doped Si electrodes also confine the light to a small propagation mode area. Both the optical field and the electric field will penetrate into the lithium niobate substrate and then overlap with one another, resulting in stronger phase modulation of the light in each arm of the MZI modulator for a given applied voltage.

Another feature of using Silicon (Si) nano-slot waveguides in lithium niobate MZI modulators is that such MZI modulators can have a relatively small footprint compared with conventional MZI modulators. Traditional lithium niobate MZI modulators are relatively bulky in size compared with most electronic and optical devices and cannot be easily integrated into a compact package housing together with the other electrical and optical devices needed for optical communications systems. For example, traditional lithium niobate MZI modulators are difficult to integrate with semiconductor diode laser chips. Using silicon (Si) nano-slot waveguides can efficiently reduce the size of the modulator and thereby enable integration of the modulator together with the laser and/or other optoelectronic devices in a compact housing.

FIG. 1 illustrates a cross-sectional view of a Si-on-lithium niobate modulator 100 according to the present invention that includes Si nano-slot waveguides 102 and the corresponding refractive index profile. The refractive index profile is shown as a grey scale. The Si nano-slot waveguide includes two high-index Si waveguides 102 surrounded by silicon dioxide ($SiO_2$) cladding layers 104. In one embodiment, the Si nano-slot waveguides 102 are bonded directly to the surface of a lithium niobate substrate 106. However, there are many other ways of forming the Si waveguide structures according to the present invention. Lithium niobate is used because it has a large electro-optic tensor (r33) and, therefore, is a highly efficient electro-optic material. In the embodiments shown in FIG. 1, the height of the Si waveguides is about 480 nm and the widths of the Si nano-slot waveguides are 220 nm wide. The gap, d, between the Si nano-slot waveguides is about 100 nm.

Figure 2:
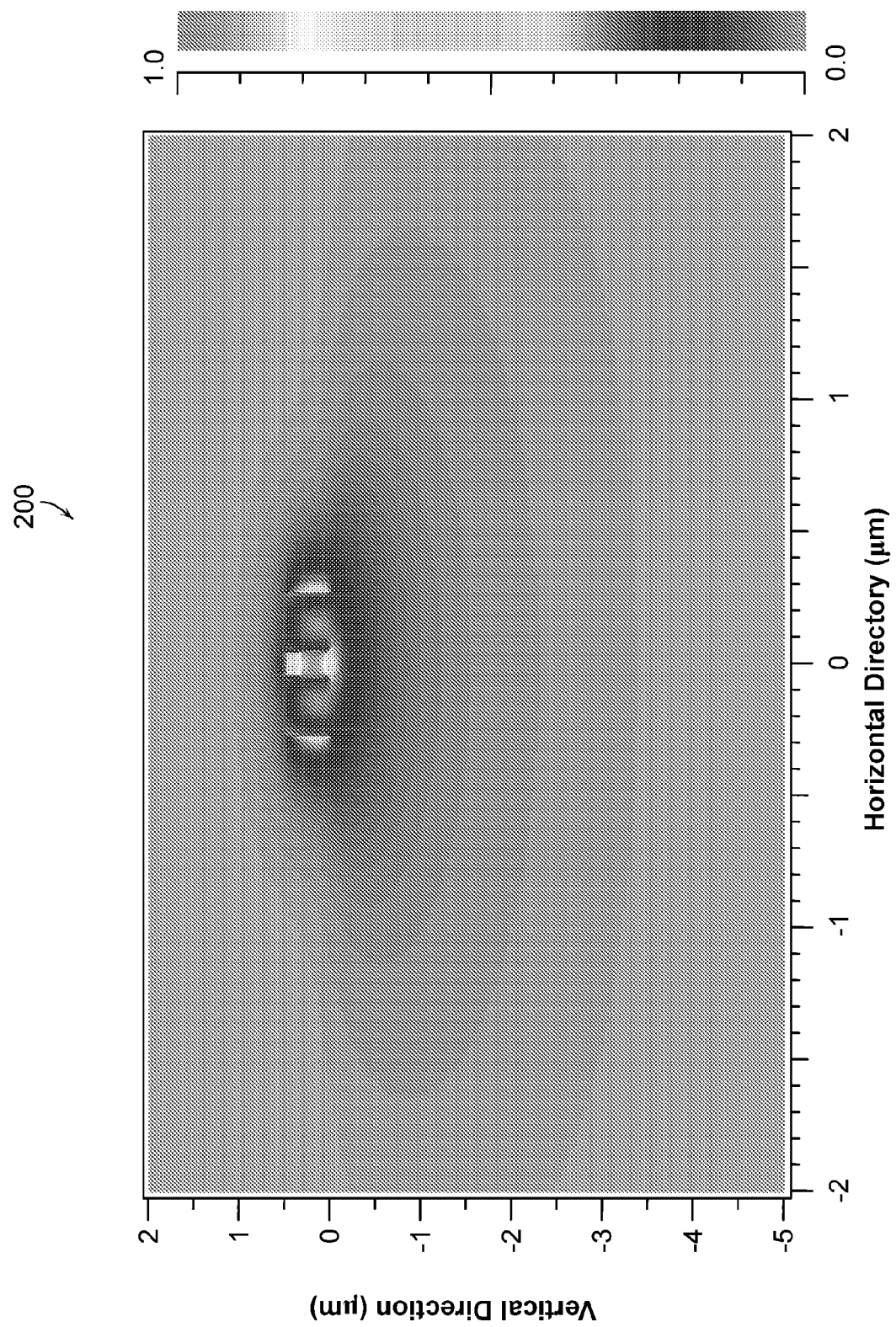
FIG. 2 is a computer simulation of the TE fundamental mode of the Si nano-slot waveguides bonded to a lithium niobate substrate.

FIG. 2 is a computer simulation 200 of the TE fundamental mode of the Si nano-slot waveguides bonded to a lithium niobate substrate. The Si nano-slot waveguides can support both TE and TM modes. However, only a simulation of the TE fundamental mode of the Si nano-slot waveguides is shown. The simulation of the TE fundamental mode was performed by using BeamPROP™, which is commercially available from RSoft Design Group, Inc. The simulation 200 assumes that the height of the Si nano-slot waveguides is 480 nm, the width of the Si nano-slot waveguides is 220 nm, and the gap between the Si nano-slot waveguides is 100 nm. Also, the indices of refraction for the Si and the silicon dioxide used in the simulation 200 were 3.48 and 1.46, respectively. In addition, the simulation of the TE fundamental mode assumes that the electro-optic material is an isotropic material with a refractive index of 2.2. Lithium niobate is, in fact, an anisotropic crystal, but this assumption does not significantly affect the simulation results.

The simulation 200 indicates that about 10% of the optical power is confined inside the slot between the two Si strips. In addition, the simulation 200 indicates that about 24% of the optical power penetrates into the lithium niobate substrate. The Si nano-slot waveguides comprise heavily doped silicon with a concentration ranging from about $10^{17}$ $cm^{-3}$ to $10^{19}$ $cm^{-3}$ which makes the waveguides highly conductive. In one embodiment, the silicon is degenerately doped. The highly conductive Si nano-slot waveguides are traveling-wave electrodes that are used for guiding the electric field generated by the input signal voltage. In addition, the highly conductive Si nano-slot waveguides confine the optical mode.

Figure 3:
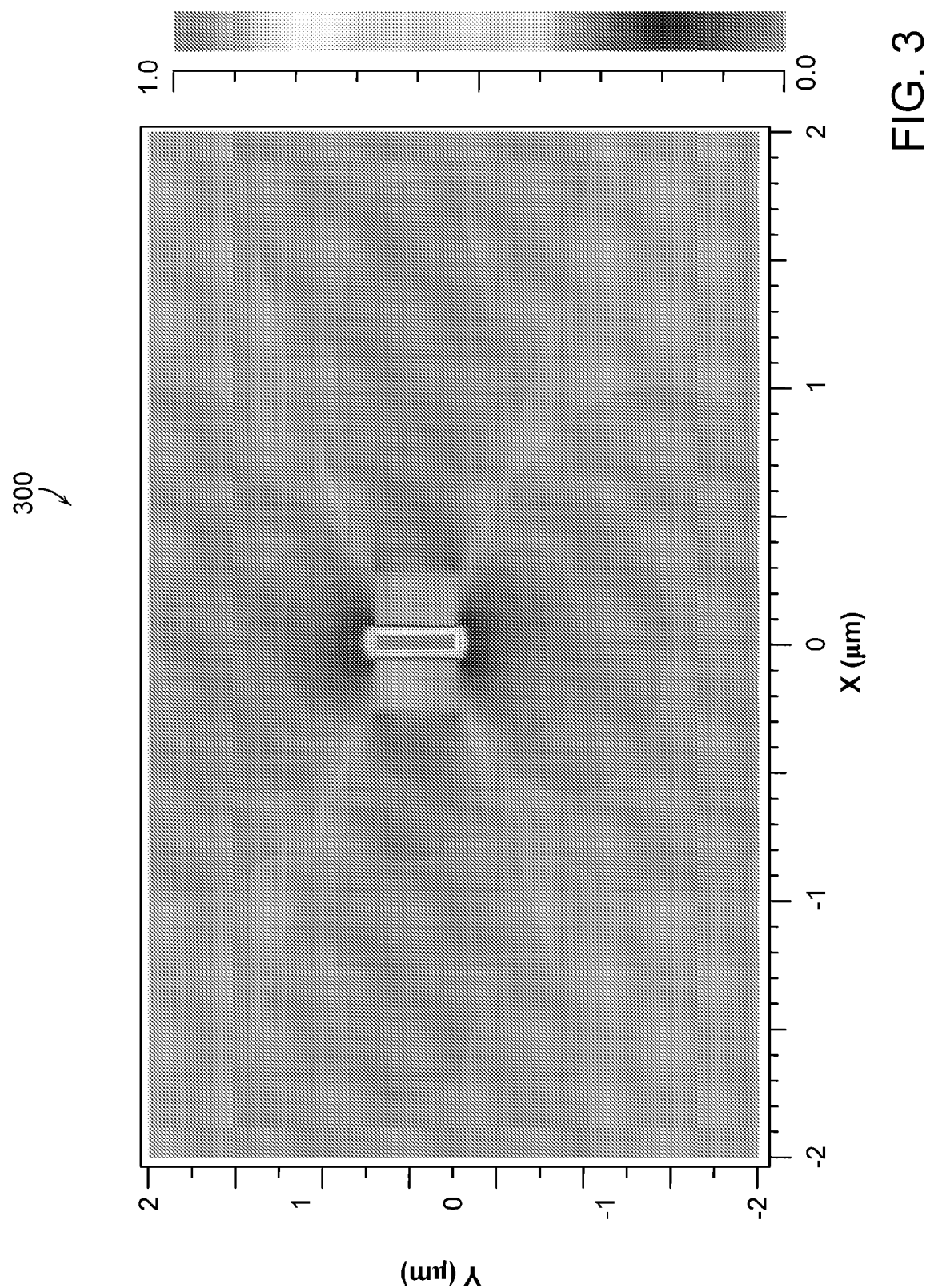
FIG. 3 is a computer simulation of a static electric field distribution proximate to the Si nano-slot waveguides.

FIG. 3 is a computer simulation 300 of a static electric field distribution proximate to the Si nano-slot waveguides. The simulation 300 assumes that the Si waveguides are ideal metal electrodes. The applied voltage to the left waveguide is +1 V and the applied voltage to the right waveguide is 0 V. The simulation 300 shows that the static transversal electric field, $E_x$, in volts per micron, where the minimum voltage per micron, is about 1.88 volts and the maximum voltage per micron is about 20.18 volts.

The simulation 300 indicates that the electric field penetrates both into the slot and into the lithium niobate substrate. However, only the electric field in the lithium niobate substrate overlaps with the optical field to impose modulation. The electro-optic overlap integral, $\Gamma$, in the lithium niobate was estimated to be about 0.062. The $V\pi \cdot L$ product is estimated to be about 0.82 V·cm with a gap between the Si nano-slot waveguides that is 100 nm. Therefore, modulators fabricated according to the present invention have $V\pi \cdot L$ products that are more than a factor of 10 smaller than that of a traditional MZM in lithium niobate.

Figure 4:
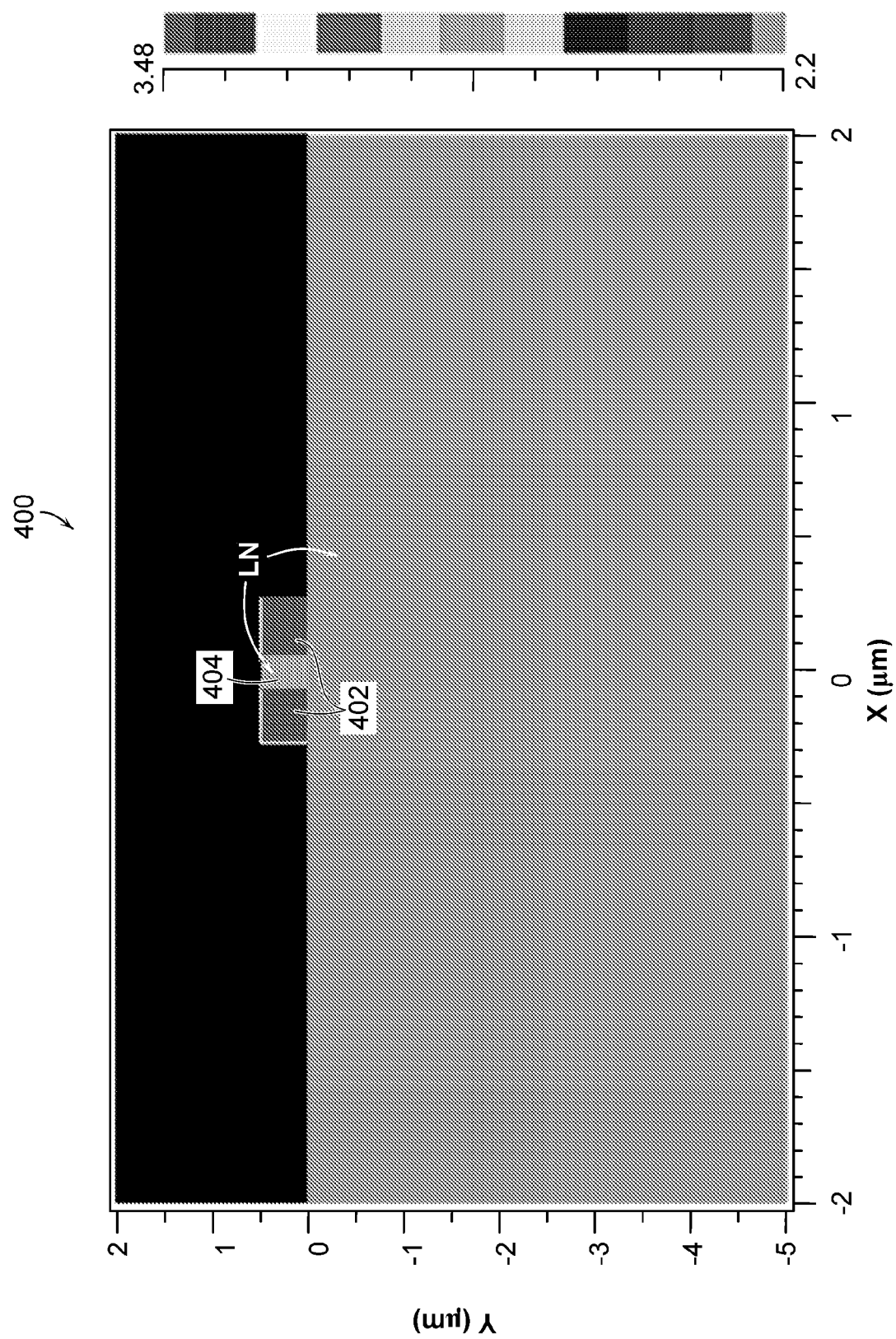
FIG. 4 illustrates a cross-sectional view of a portion of a Si-on-lithium niobate modulator according to the present invention and the corresponding refractive index profile that shows the nano-slot waveguides with the nano slot filled with lithium niobate.

FIG. 4 illustrates a cross-sectional view of a portion of a Si-on-lithium niobate modulator 400 according to the present invention and the corresponding refractive index profile that shows the nano-slot waveguides 402 with the nano slot 404 filled with lithium niobate. Filling the nano-slot 404 with lithium niobate will further reduce the $V\pi \cdot L$ product of the modulator compared with known optical modulators because the lithium niobate material in the nano slot 404 will significantly increase the confinement of both the optical field and the electric field inside the nano-slot 404. This increase in the confinement increases the magnitude of the overlap integral and, therefore, decreases the $V\pi \cdot L$ product. One skilled in the art will appreciate that there are numerous other materials that can be used to fill the nano-slot 404 and that these materials can be chosen to reduce the Vπ·L product.

The confinement factor, Γ, for the Si-on-lithium niobate modulator 400 according to the present invention with the nano slot 404 filled with lithium niobate is estimated to be about 0.252. The Vπ·L product was also estimated to be only about 0.2 V·cm assuming that the optical and electric field distribution do not change significantly with the introduction of the lithium niobate in the nano slot 404. The Vπ·L product can be reduced to about 0.1 V·cm if the driving electrodes are driven in a push-pull operating mode. Such an optical modulator will have a Vπ·L product that is more than a factor of 100 smaller than that of a traditional lithium niobate MZI modulator.

Figure 5:
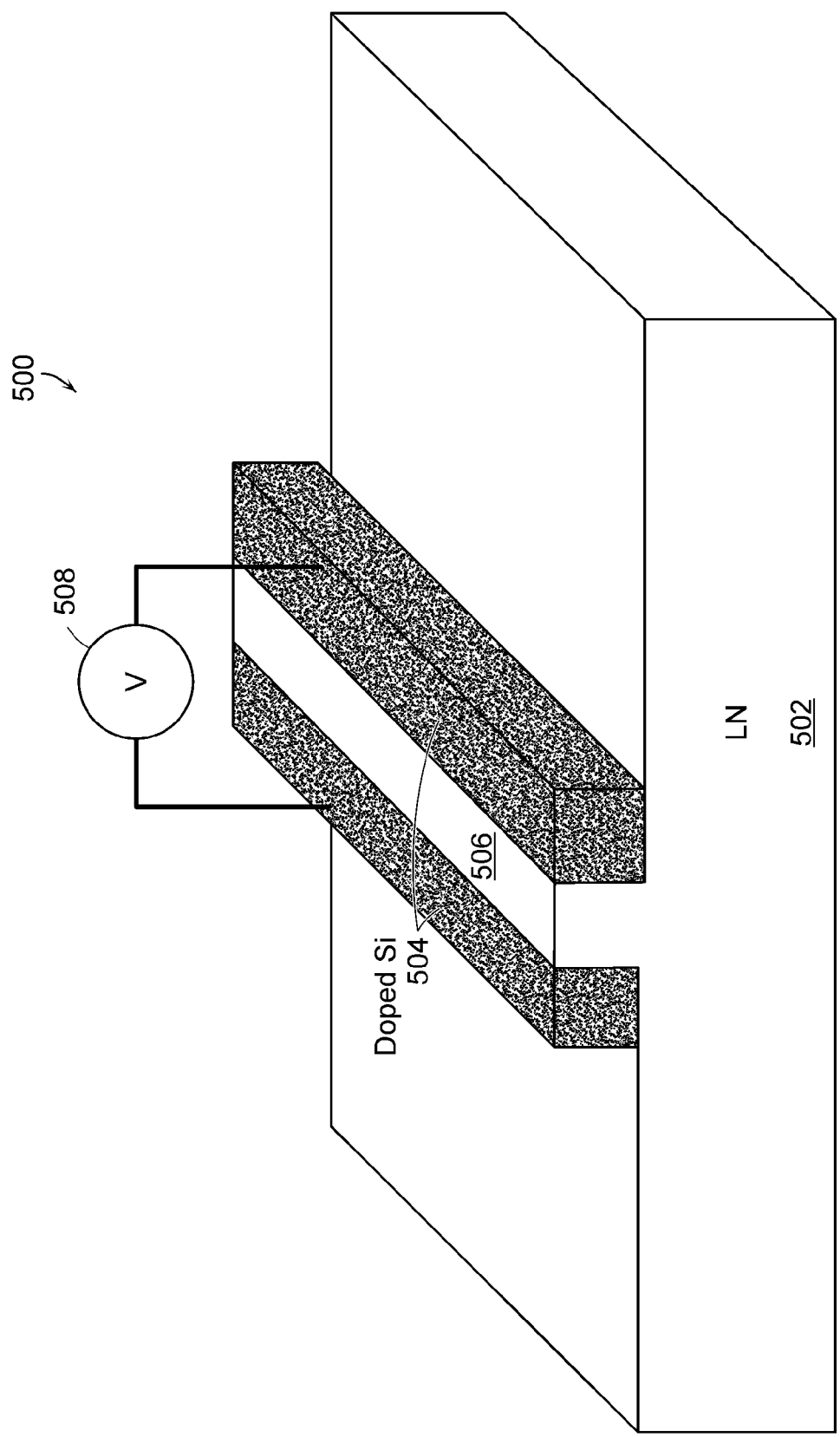
FIG. 5 illustrates a schematic diagram of a Si-on-lithium niobate modulator according to the present invention.

FIG. 5 illustrates a schematic diagram of a Si-on-lithium niobate modulator 500 according to the present invention. The modulator 500 includes a lithium niobate substrate 502. In other embodiments, the modulator 500 includes a different type of electro-optic material substrate, such as LiTaO3, KDP, ZnTe, and ZnSe. Two doped Si waveguides 504 are fabricated on the top surface of the substrate 502 to form a Si nano-slot structure 506. A thin metal layer can be deposited on top of the doped Si waveguides 504 to form an electrode.

In one embodiment, the Si nano-slot structure 506 is filled with lithium niobate as described in connection with the simulation of FIG. 4. In other embodiments, the lithium niobate nano-slot structure 506 is filled with a dielectric material, such as silicon dioxide or some polymer like material.

The doped Si waveguides 504 can be formed by any means. For example, the doped Si waveguides 504 can be formed by depositing hydrogenated amorphous silicon (a-Si:H) material on the surface of the lithium niobate substrate 502. Hydrogenated amorphous silicon material has been used extensively to fabricate solar cells because it is relatively inexpensive and can be deposited uniformly over very large areas. The hydrogen introduced into the amorphous silicon terminates the defects. The nano-slot waveguides can be used as modulation electrodes if the a-Si:H material waveguides are doped with an n-type dopant or p-type dopant.

For example, the a-Si:H material can be deposited on the lithium niobate substrate 502 by plasma-enhanced chemical vapor deposition (PECVD) at low temperature (~400° C.). The refractive index of a-Si:H material for 1550 nm optical wavelength is about 3.4. The refractive index of a-Si:H material is much higher than the refractive index of lithium niobate, which is 2.2 and 2.14 for the ordinary and the extraordinary optical axial modes, respectively. The large refractive index difference between the Si and the surrounding material causes strong optical guiding which enables the doped Si waveguides 504 to confine the light in a sub-micron region. The resulting propagation loss in the a-Si:H waveguide is relatively low, which can be on order of about 2 dB/cm.

In operation, phase modulation is achieved in the Si-on-lithium niobate modulator 500 by applying a modulating voltage from a voltage source 508 to the doped Si waveguides 504. The modulation voltage generates a sufficient electric field in the vicinity of the nano-slot structure 506 or inside the nano-slot structure 506 to change the light propagation phase.

Figure 6:
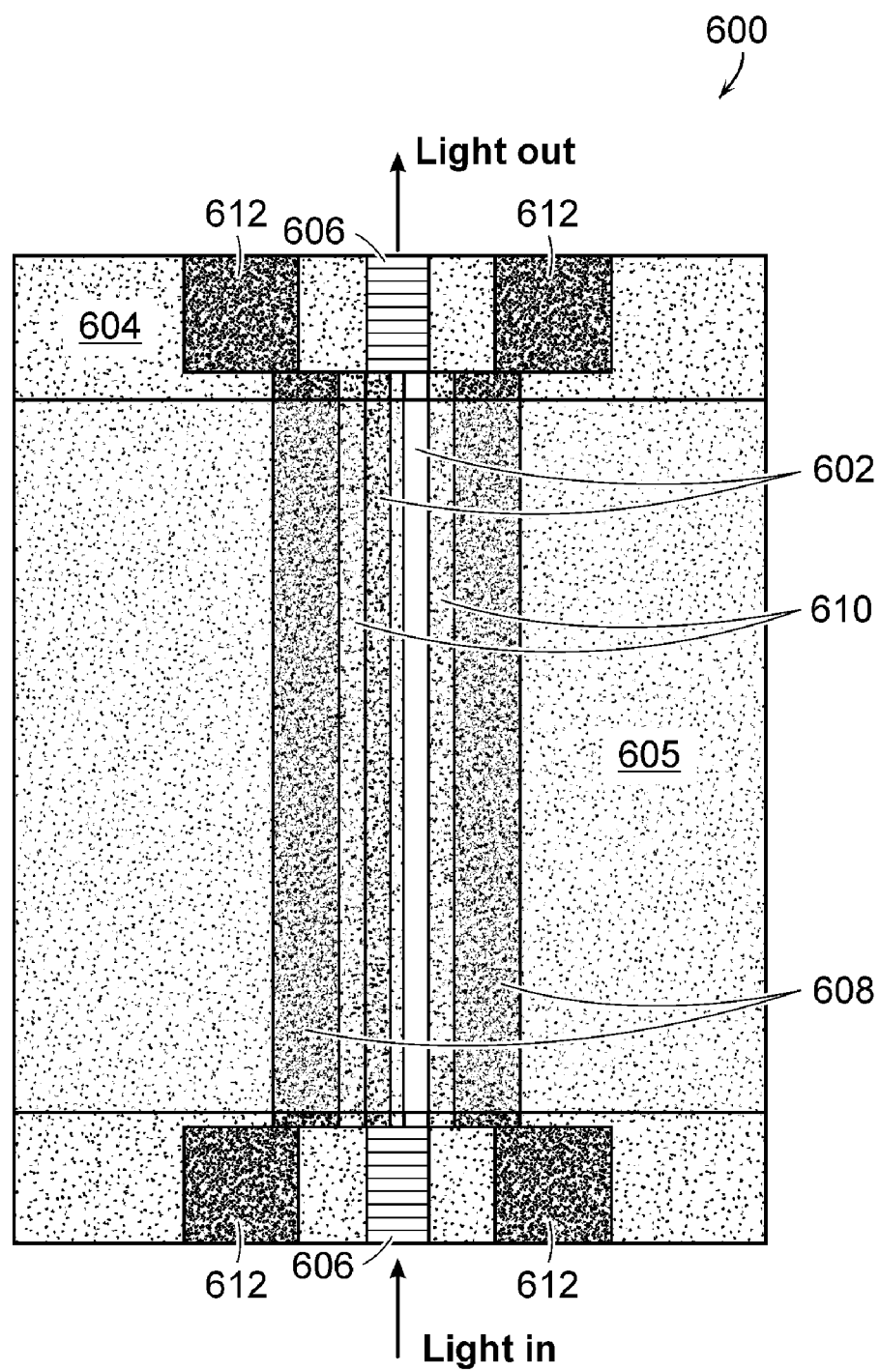
FIG. 6 illustrates a schematic diagram of another Si-on-lithium niobate modulator according to the present invention that is fabricated by flip chip bonding.

FIG. 6 illustrates a schematic diagram of another Si-on-lithium niobate modulator 600 according to the present invention that is fabricated by flip chip bonding. Flip chip bonding is well known in the art. It is relatively inexpensive to bond devices together using flip chip bonding. Doped Si waveguides 602 are fabricated on a Silicon-on-Isolator (SOI) substrate 604 to form a nano-slot structure as described in connection with FIG. 5. The cross-sectional view of the doped Si waveguides 602 is similar to the cross-sectional view shown in FIG. 1.

The modulator 600 includes a lithium niobate substrate 605. The doped Si waveguides 602 are then flip-chip bonded on the top of the lithium niobate substrate 605. A coupling section 606 is formed at the input and the output of the modulator 600. Fiber coupling loss to the doped Si waveguides 602 can be reduced by using a grating coupler structure for vertical coupling or a reverse taper coupling structure for edge coupling at the input and output section of the doped Si waveguides 602.

Traveling wave electrodes 608 are fabricated on both sides of the Si-nano-slot structure and electrically connected with the doped Si waveguides 602 using heavily doped silicon connectors 610. Probe pads 612 are fabricated at the input and output ends of the traveling wave electrodes 608. These probe pads 612 can be used for both RF probing and to connect a proper termination to the traveling wave electrodes 608. The metal thickness of the traveling electrodes 608 is typically thinner than the thickness of the probe pads 612 in order to facilitate easy flip-chip bonding.

Figure 7:
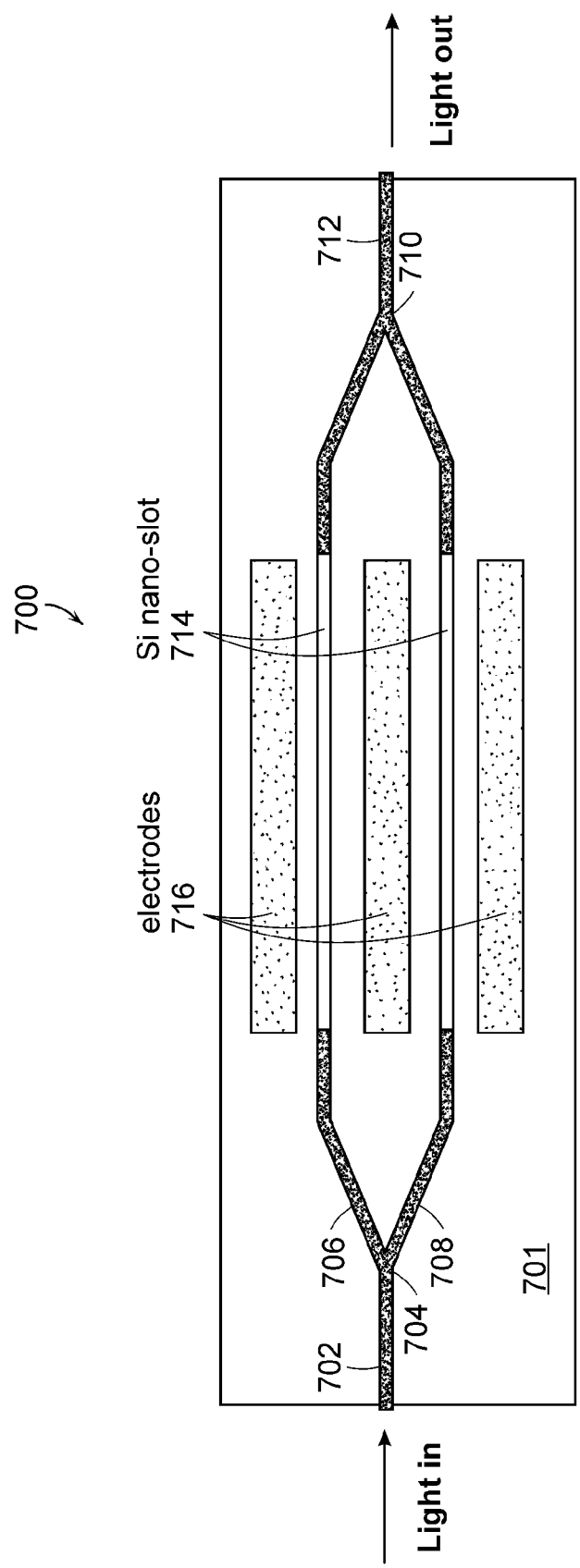
FIG. 7 illustrates a schematic diagram of a top view of an optical intensity modulator according to the present invention that includes two Si-on-lithium niobate modulators according to the present invention that are positioned in the arms of a Mach-Zehnder interferometer structure.

FIG. 7 illustrates a schematic diagram of a top view of an optical intensity modulator 700 according to the present invention that includes two Si-on-lithium niobate modulators according to the present invention that are positioned in the arms of a conventional Mach-Zehnder interferometer structure. The optical intensity modulator 700 includes a lithium niobate substrate 701 and lithium niobate waveguides having an input 702, a Y-junction splitter 704, a first 706 and second arm 708, a Y-junction combiner 710, and an output 712. Also, the optical intensity modulator 700 includes doped silicon electrodes 714 that form a Si nano-slot structure as described in connection with FIGS. 5 and 6. In addition, the optical intensity modulator 700 includes electrodes 716 where modulation signals are applied.

In operation, light is coupled into the input waveguide 702 on the lithium niobate substrate 701 and is then split by the Y-junction splitter 704 into the first 706 and second arms 708. The light in each of the arms is then phase modulated or phase shifted by the modulation signal applied to the electrodes 716. The modulator 700 can operate in a push-pull mode by driving electrodes on both arms of the Mach-Zehnder interferometer. The push-pull mode of operation can increase the optical phase in one arm and decrease the optical phase in the other arm simultaneously. The intensity of the modulated light varies from "1" if the light in the two arms is in phase to "0" if the light in the two arms is 180° out of phase.

Equivalents

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, which may be made therein without departing from the spirit and scope of the invention.

What is claimed is:

1. A modulator comprising:
   a. an electro-optical substrate;
   b. a first and second waveguide formed of a doped semiconductor material positioned on a surface of an electro-optical substrate forming a slot therebetween, a doping level of the semiconductor material being chosen to make the first and second waveguide conductive; and
   c. lithium niobate material positioned in the slot, the lithium niobate material increasing confinement of both an optical field and an electrical field inside the slot, a refractive index of the semiconductor material and a refractive index of the lithium niobate material positioned in the slot reducing a V$\pi$·L product of the modulator.

2. The modulator of claim 1 wherein the electro-optical substrate comprises a lithium niobate substrate.

3. The modulator of claim 1 wherein the first and the second waveguides comprise doped silicon with a dopant concentration that is in the range of $10^{17}$ cm$^{-3}$ to $10^{19}$ cm$^{-3}$.

4. The modulator of claim 1 wherein the first and the second waveguides comprise degenerately doped silicon.

5. The modulator of claim 1 further comprising a metal layer deposited on top of the doped semiconductor material that forms an electrode.

6. The modulator of claim 1 wherein a width of the slot is less than 200 nm.

7. The modulator of claim 1 wherein the first and the second waveguide comprise hydrogenated amorphous silicon (a-Si:H).

8. The modulator of claim 1 wherein the first and the second waveguide are fabricated on a Silicon-on-Isolator (SOI) substrate and then bonded to the electro-optical substrate.

9. A Si-on-lithium niobate modulator comprising:
   a. an lithium niobate substrate;
   b. a first and second doped silicon waveguide positioned on a surface of lithium niobate substrate forming a slot therebetween, a doping level of the silicon being chosen to make the first and second doped silicon waveguide conductive; and
   c. lithium niobate material positioned in the slot, the lithium niobate material increasing confinement of both an optical field and an electrical field inside the slot.

10. The modulator of claim 9 further comprising a metal layer deposited on top of the doped semiconductor material that forms an electrode.

11. The modulator of claim 9 wherein a width of the slot is less than 200 nm.

12. The modulator of claim 9 wherein the first and second doped silicon waveguide comprise hydrogenated amorphous silicon (a-Si:H).

13. The modulator of claim 9 wherein the first and the second waveguide are fabricated on a Silicon-on-Isolator (SOI) substrate and then bonded to the electro-optical substrate.

14. A method of fabricating a Si-on-lithium niobate modulator, the method comprising:
   a. forming a first and a second doped Si waveguide on an insulating substrate;
   b. forming a lithium niobate material between the first and the second doped Si waveguide; and
   c. bonding the first and the second doped Si waveguide to a lithium niobate substrate.

15. The method of claim 14 wherein the bonding the first and the second doped Si waveguide to the lithium niobate substrate comprises flip-chip bonding.

16. The method of claim 14 further comprising depositing a metal layer on top of the first and the second doped Si waveguide thereby forming electrodes.

17. The method of claim 14 wherein the forming the first and the second doped Si waveguide comprises depositing hydrogenated amorphous silicon (a-Si:H).

* * * * *